US010027136B2

(12) United States Patent
Sugiyama et al.

(10) Patent No.: US 10,027,136 B2
(45) Date of Patent: Jul. 17, 2018

(54) BATTERY AND ELECTRIC BICYCLE

(71) Applicant: KABUSHIKI KAISHA TOSHIBA, Tokyo (JP)

(72) Inventors: Nobukatsu Sugiyama, Kanagawa (JP); Ena Ishii, Kanagawa (JP); Tomokazu Morita, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 15/259,647

(22) Filed: Sep. 8, 2016

(65) Prior Publication Data
US 2017/0229883 A1    Aug. 10, 2017

(30) Foreign Application Priority Data

Feb. 5, 2016    (JP) .................. 2016-020900

(51) Int. Cl.
| | |
|---|---|
| *H01M 10/46* | (2006.01) |
| *H02J 7/00* | (2006.01) |
| *H01M 10/42* | (2006.01) |
| *H01M 10/44* | (2006.01) |
| *H01M 10/48* | (2006.01) |
| *B60L 11/18* | (2006.01) |

(52) U.S. Cl.
CPC ......... *H02J 7/0019* (2013.01); *B60L 11/1853* (2013.01); *B60L 11/1864* (2013.01); *B60L 11/1866* (2013.01); *H01M 10/4257* (2013.01); *H01M 10/443* (2013.01); *H01M 10/482* (2013.01); *H01M 10/486* (2013.01); *H02J 7/007* (2013.01); *H02J 7/0021* (2013.01); *B60L 2200/12* (2013.01); *B60L 2240/36* (2013.01); *B60L 2240/545* (2013.01); *B60L 2240/547* (2013.01); *B60L 2240/549* (2013.01); *H01M 2010/4271* (2013.01); *H01M 2010/4278* (2013.01); *H01M 2220/20* (2013.01); *Y02T 10/7005* (2013.01); *Y02T 10/7061* (2013.01)

(58) Field of Classification Search
CPC ....... H02J 7/0014; H02J 7/0018; H02J 7/0019
USPC .................. 320/104, 116, 118, 119, 150
See application file for complete search history.

(56) References Cited

U.S. PATENT DOCUMENTS

| | | | |
|---|---|---|---|
| 5,387,657 A | 2/1995 | Honda, et al. | |
| 8,143,851 B2 * | 3/2012 | Greening | G06F 1/189 320/116 |

(Continued)

FOREIGN PATENT DOCUMENTS

| | | |
|---|---|---|
| JP | 5-64377 | 3/1993 |
| JP | 2003-348760 | 12/2003 |

(Continued)

*Primary Examiner* — Edward Tso
(74) *Attorney, Agent, or Firm* — Finnegan, Henderson, Farabow, Garrett & Dunner, L.L.P.

(57) ABSTRACT

According to one embodiment, a battery includes: a first wire; a second wire; a third wire; a first resistor; a first switch; a second switch; a second resistor; a voltage measurer; and a controller that calculates a second resistance value of the third wire using a first voltage of a first battery when the first switch is turned on and the second switch is turned off, a second voltage of a second battery when the first switch is turned on and the second switch is turned off, a third voltage of the second battery when the first switch is turned off and the second switch is turned off, and a first resistance value of the first resistor.

5 Claims, 5 Drawing Sheets

(56) References Cited

U.S. PATENT DOCUMENTS

2012/0086399 A1* 4/2012 Choi .................. H02J 7/0016
                                                    320/116
2012/0146652 A1   6/2012 Aoki et al.
2014/0062408 A1   3/2014 Skino et al.
2015/0051771 A1* 2/2015 Greenwood .............. B60L 3/04
                                                    701/22

FOREIGN PATENT DOCUMENTS

| JP | 2011-19329  | 1/2011 |
| JP | 2011-75504  | 4/2011 |
| JP | 2012-122856 | 6/2012 |
| JP | 2014-68524  | 4/2014 |
| JP | 2014-164853 | 9/2014 |

\* cited by examiner

BATTERY AND ELECTRIC BICYCLE

CROSS-REFERENCE TO RELATED APPLICATION

This application claims priority from Japanese Patent Application No. 2016-020900 filed on Feb. 5, 2016, the contents of which are incorporated herein by reference in their entirety.

FIELD

Embodiments described herein relate generally to a battery and an electric bicycle.

BACKGROUND

A battery module has a configuration in which a plurality of secondary batteries are serially connected.

A battery measures voltages of the secondary batteries of the battery module and adjusts the voltages or amounts of charge.

In order to adjust a voltage or an amount of charge of a secondary battery, it is necessary to calculate a resistance value of a wire connected to the secondary battery in advance.

Some conventional methods of calculating a resistance value of a wire use voltages which are measured before and after a current flows in a circuit.

However, since a resistance value of an internal resistor of a battery is too small and is thus ignored, the resistance value of the internal resistor is not considered when calculating the resistance value of the wire.

Accordingly, in the conventional methods of calculating a resistance value of a wire, it is not possible to calculate an accurate resistance value of a wire.

DETAILED DESCRIPTION

Figure 1:
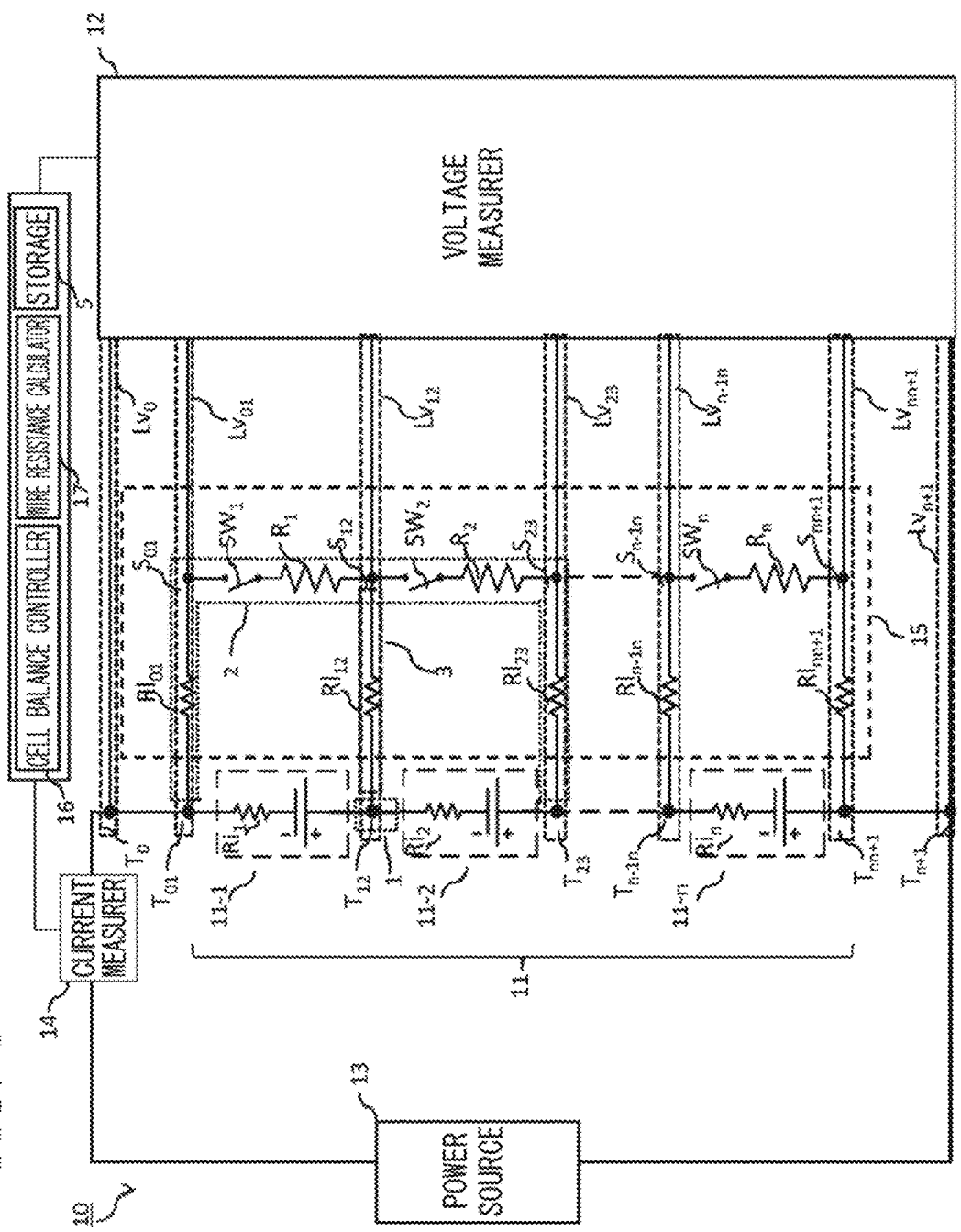
FIG. 1 is a diagram showing a configuration of a battery.

According to one embodiment, a battery includes: a first battery that includes a first positive electrode and a first negative electrode; a second battery that includes a second positive electrode and a second negative electrode; a first wire that connects the first positive electrode and the second negative electrode; a second wire that connects the first negative electrode and the second positive electrode; a third wire that connects the first wire and the second wire; a first resistor that is inserted into the second wire between a junction point of the second wire and the third wire and the first negative electrode; a first switch that is inserted into the second wire between the first resistor and the first negative electrode; a second switch that is inserted into the second wire between the junction point and the second positive electrode; a second resistor that is inserted into the second wire between the second switch and the second positive electrode; a voltage measurer that measures a voltage between the first switch and the first negative electrode in the second wire, a voltage between the second resistor and the second positive electrode in the second wire, and a voltage of the junction point; and a controller, wherein the controller calculates a second resistance value of the third wire using a first voltage of the first battery when the first switch is turned on and the second switch is turned off, a second voltage of the second battery when the first switch is turned on and the second switch is turned off, a third voltage of the second battery when the first switch is turned off and the second switch is turned off, and a first resistance value of the first resistor.

Hereinafter, embodiments will be described with reference to the accompanying drawings.

Like elements will be provided with like reference signs.

The drawings are schematic or conceptual, and a relationship between a thickness and a width of each element, and sizes, specific coefficients, and the like of the elements cannot be said to be the same as they actually are.

The same element may be drawn with different sizes or specific coefficients in the drawings.

First Embodiment

FIG. 1 shows a configuration of a battery 10.

The battery 10 includes a secondary battery module 11, a voltage measurer 12, a power source 13, a current measurer 14, a cell balancing circuit 15, a cell balance controller 16, a storage 5, and a wire-resistance calculator 17.

The secondary battery module 11 includes n secondary battery cells 11-1, 11-2, ..., and 11-n which are connected in series.

The secondary battery cells 11-1, 11-2, ..., and 11-n are secondary batteries such as lithium ion batteries.

It is assumed that electromotive forces of the secondary battery cells 11-1, 11-2, ..., and 11-n are defined as $E_1$, $E_2$, , and $E_n$, respectively, and internal resistors of the secondary battery cells 11-1, 11-2, ..., and 11-n are defined as $Ri_1$, $Ri_2$, ..., and $Ri_n$, respectively.

The power source 13 is connected to a plus-side terminal and a minus-side terminal of the secondary battery module 11.

When the power source 13 is connected to the secondary battery module 11, the secondary battery module 11 is charged.

The power source 13 may be replaced with a load for use.

The load is a circuit or an element that consumes electric power.

When the load is connected to the secondary battery module 11, electric power of the secondary battery module 11 is consumed.

A voltage measuring line $Lv_0$ is a wire that connects a junction point $T_0$ and the voltage measurer 12.

A voltage measuring line $Lv_{n+1}$ is a wire that connects a junction point $T_{n+1}$ and the voltage measurer 12.

A voltage measuring line $Lv_{01}$ connects a junction point $T_{01}$ and the voltage measurer 12.

A voltage measuring line $Lv_{12}$ connects a junction point $T_{12}$ and the voltage measurer 12.

A voltage measuring line $Lv_{23}$ connects a junction point $T_{23}$ and the voltage measurer 12.

A voltage measuring line $Lv_{n+1}$ connects a junction point $T_{nn+1}$ and the voltage measurer 12.

The voltage measurer 12 measures a voltage between the plus-side terminal and the minus-side terminal of the secondary battery module 11.

The voltage measurer 12 measures a voltage between a positive electrode terminal and a negative electrode terminal of each of the secondary battery cells 11-1, 11-2, ..., and 11-$n$.

A junction point $S_{01}$ of the voltage measuring line $Lv_{01}$ and a junction point $S_{12}$ of the voltage measuring line $Lv_{12}$ are connected.

A switch $SW_1$ and a resistor $R_1$ are inserted between the junction point $S_{01}$ of the voltage measuring line $Lv_{01}$ and the junction point $S_{12}$ of the voltage measuring line $Lv_{12}$.

The junction point $S_{12}$ of the voltage measuring line $Lv_{12}$ and a junction point $S_{23}$ of the voltage measuring line $Lv_{23}$ are connected.

A switch $SW_2$ and a resistor $R_2$ are inserted between the junction point $S_{12}$ of the voltage measuring line $Lv_{12}$ and the junction point $S_{23}$ of the voltage measuring line $Lv_{23}$.

A junction point $S_{n-1n}$ of a voltage measuring line $Lv_{n-1n}$ and a junction point $S_{nn+1}$ of the voltage measuring line $Lv_{nn+1}$ are connected.

A switch $SW_n$ and a resistor $R_n$ are inserted between the junction point $S_{n-1n}$ of the voltage measuring line $Lv_{n-1n}$ and the junction point $S_{nn+1}$ of the voltage measuring line $Lv_{nn+1}$.

The voltage measuring line $Lv_{01}$ between the junction point $T_{01}$ and the junction point $S_{01}$ includes a wire resistor $Rl_{01}$.

The voltage measuring line $Lv_{12}$ between the junction point $T_{12}$ and the junction point $S_{12}$ includes a wire resistor $Rl_{12}$.

The voltage measuring line $Lv_{23}$ between the junction point $T_{23}$ and the junction point $S_{23}$ includes a wire resistor $Rl_{23}$.

The voltage measuring line $Lv_{nn+1}$ between the junction point $T_{nn+1}$ and the junction point $S_{nn+1}$ includes a wire resistor $Rl_{nn+1}$.

The current measurer 14 is serially connected to the secondary battery module 11.

The current measurer 14 measures a current flowing in the secondary battery module 11.

The cell balance controller 16 controls switching of the switches $SW_1, SW_2, \ldots,$ and $SW_n$.

For example, when the switch $SW_1$ is turned on, the secondary battery cell 11-1 is connected to the resistor $R_1$ and the secondary battery cell 11-1 is in a discharging state.

The wire-resistance calculator 17 calculates a resistance value of each of the wire resistors $Rl_{01}, Rl_{12}, \ldots, Rl_{n-1n}$, and $Rl_{nn+1}$.

The storage 5 stores the voltage values of the secondary battery cells 11-1, 11-2, ..., and 11-$n$ measured by the voltage measurer 12, the current values measured by the current measurer 14, and the resistance values of the wire resistors $Rl_{01}, Rl_{12}, \ldots,$ and $Rl_{n-1n}$, and $Rl_{nn+1}$ calculated by the wire-resistance calculator 17.

The cell balance controller 16 and the wire-resistance calculator 17 may be controlled by one controller (one circuit).

The cell balancing circuit 15 is a part including the secondary battery module 11, the switches $SW_1, SW_2, \ldots,$ and $SW_n$, and the resistors $R_1, R_2, \ldots,$ and $R_n$.

The cell balancing circuit 15 is a circuit that equalizes the voltages of the secondary battery cells 11-1, 11-2, ..., and 11-$n$ with each other.

The cell balancing circuit 15 is not particularly limited as long as it can individually charge and discharge one or more secondary battery cells.

Here, arrangement of parts will be described with a focus on the secondary battery cell (a first battery) 11-1 and the secondary battery cell (a second battery) 11-2 among the secondary battery cells 11-1, 11-2, ..., and 11-$n$.

The positive electrode (a first positive electrode) of the secondary battery cell 11-1 and the negative electrode (a second negative electrode) of the secondary battery cell 11-2 are connected by a wire (a first wire) 1.

The negative electrode (a first negative electrode) of the secondary battery cell 11-1 and the positive electrode (a second positive electrode) of the secondary battery cell 11-2 are connected by a wire (a second wire) 2.

A wire (a third wire) 3 connects the junction point $T_{12}$ of the wire 1 and the junction point $S_{12}$ of the wire 2.

In the wire 2, the resistor (a first resistor) $R_1$ is inserted in series between the junction point $S_{12}$ and the negative electrode (the first negative electrode) of the secondary battery cell 11-1.

In the wire 2, the switch (a first switch) $SW_1$ is inserted in series between the resistor (the first resistor) $R_1$ and the negative electrode (the first negative electrode) of the secondary battery cell 11-1.

In the wire 2, the switch (a second switch) $SW_2$ is inserted in series between the junction point $S_{12}$ and the positive electrode (the second positive electrode) of the secondary battery cell 11-2.

In the wire 2, the resistor (a second resistor) $R2$ is inserted in series between the switch (the second switch) $SW_2$ and the positive electrode (the second positive electrode) of the secondary battery cell 11-2.

The voltage measurer 12 measures a voltage between the resistor $R_2$ and the positive electrode (the second positive electrode) of the secondary battery cell 11-2 in the wire 2, a voltage between the switch $SW_1$ and the negative electrode (the first negative electrode) of the secondary battery cell 11-1 in the wire 2, and a voltage of the junction point $S_{12}$.

The voltages of the secondary battery cells 11-1, 11-2, ..., and 11-$n$ which are measured by the voltage measurer 12 are defined as $v_1$ (V), $v_2$ (V), ..., and $v_n$ (V).

The voltage of the secondary battery module 11 that is measured by the voltage measurer 12 is defined as v (V).

The voltage measuring line $Lv_0$ and the voltage measuring line $Lv_{01}$ may be formed as a single wire.

The voltage measuring line $Lv_{n+1}$ and the voltage measuring line $Lv_{nn+1}$ may be formed as a single wire.

The wire-resistance calculator 17 calculates the resistance values of the wire resistors $Rl_{01}, Rl_{12}, \ldots, Rl_{n-1n}$, and $Rl_{nn+1}$ when the absolute value of the current measured by the current measurer 14 is sufficiently small, that is, when the secondary battery module 11 is neither charged nor discharged.

One of the switches $SW_1$ to $SW_n$ is turned on every predetermined interval k, and the resistance values of the wire resistors $Rl_{01}, Rl_{12}, \ldots, Rl_{n-1n}$, and $Rl_{nn+1}$ are calculated.

Here, k is a predetermined natural number and is preferably 1 or 2.

When k=1, the cell balance controller 16 turns on the switch $SW_1$.

When the switch $SW_1$ is turned on, the wire-resistance calculator 17 calculates the resistance values of the wire resistor $Rl_{01}$ and the wire resistor $Rl_{12}$.

The cell balance controller 16 turns off the switch $SW_1$ and then turns on the switch $SW_2$.

The wire-resistance calculator 17 calculates the resistance values of the wire resistor $Rl_{12}$ and the wire resistor $Rl_{23}$.

The resistance value of the wire resistor $Rl_{12}$ is calculated two times when the switch $SW_1$ is turned on and when the switch $SW_2$ is turned off.

The wire-resistance calculator 17 can improve calculation accuracy of the resistance value of the wire resistor $Rl_{12}$ by calculating an average of the resistance values of the wire resistor $Rl_{12}$.

When k=2, the cell balance controller 16 turns on the switch $SW_1$.

When the switch $SW_1$ is turned on, the wire-resistance calculator 17 calculates the resistance values of the wire resistor $Rl_{01}$ and the wire resistor $Rl_{12}$.

The cell balance controller 16 turns off the switch $SW_1$ and then turns on the switch SW3.

The wire-resistance calculator 17 calculates the resistance values of the wire resistor $Rl_{23}$ and the wire resistor $Rl_{34}$.

When k=2, the wire-resistance calculator 17 calculates the resistance values of the wire resistors $Rl_{01}, Rl_{12}, \ldots, Rl_{n-1n}$, and $Rl_{nn+1}$ at least one time.

Since the number of switches $SW_1, SW_2, \ldots,$ and $SW_n$ which are controlled by the cell balance controller 16 is smaller than that of when k=1, a time in which the wire-resistance calculator 17 calculates the resistance values of the wire resistors $Rl_{01}, Rl_{12}, \ldots, Rl_{n-1n}$, and $Rl_{nn+1}$ is shorter.

When k>2, all of the resistance values of the wire resistors $Rl_{01}, Rl_{12}, \ldots, Rl_{n-1n}$, and $Rl_{nn+1}$ cannot be calculated, and thus all of the resistance values of all of the wire resistors $Rl_{01}, Rl_{12}, \ldots, Rl_{n-1n}$, and $Rl_{nn+1}$ are calculated by interpolation.

For example, it is assumed that the resistance values of the wire resistors $Rl_{01}, Rl_{12}, \ldots, Rl_{n-1n}$, and $Rl_{nn+1}$ are the same.

At this time, an average value of the resistance values of the wire resistors $Rl_{01}, Rl_{12}, \ldots, Rl_{n-1n}$, and $Rl_{nn+1}$ which are calculated by the wire-resistance calculator 17 is set as the resistance values of all the wire resistors $Rl_{01}, Rl_{12}, \ldots, Rl_{n-1n}$, and $Rl_{nn+1}$.

Figure 2:
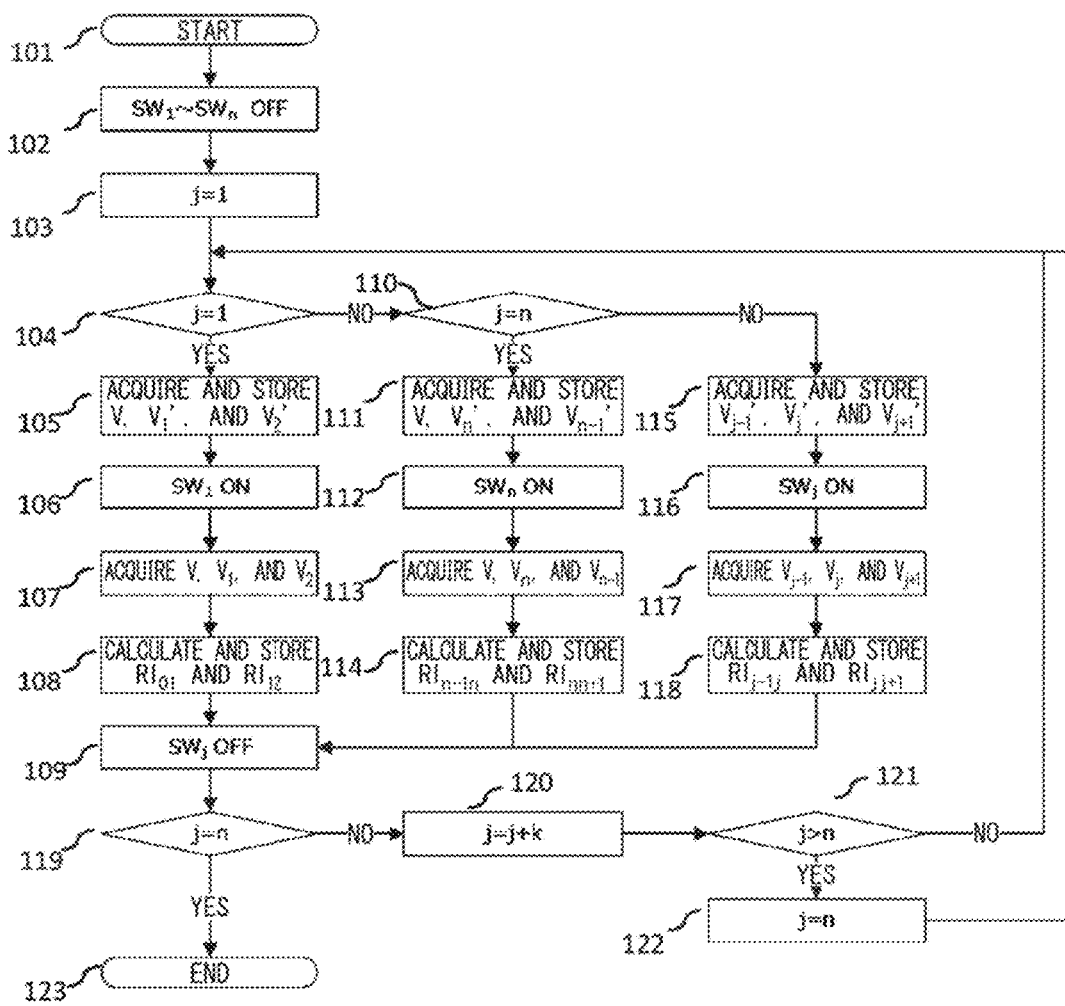
FIG. 2 is a diagram showing a process flow of a wire-resistance calculator.

FIG. 2 shows a process flow of the wire-resistance calculator 17.

The wire-resistance calculator 17 starts a process flow (Step 101).

The cell balance controller 16 turns off all switches (Step 102).

Here, j denotes the number of the switches $SW_1, SW_2, \ldots,$ and $SW_n$ controlled by the cell balance controller 16, and j is any one of $1, 2, \ldots,$ and n.

When j=1 (Step 104), the wire-resistance calculator 17 stores the voltage v of the secondary battery module 11, the voltage $v_1$ of the secondary battery cell 11-1, and the voltage $v_2$ of the secondary battery cell 11-2 which are measured by the voltage measurer 12 in the storage 5, and defines the voltages as V', $V_1$', and $V_2$'.

Since no current flows in the secondary battery module 11, the voltage V' of the secondary battery module 11, the voltage $V_1$' (a fifth voltage) of the secondary battery cell 11-1, and the voltage $V_2$' (a third voltage) of the secondary battery cell 11-2 are the same as an electromotive force $E_1+E_2+ \ldots +E_n$ of the secondary battery module 11, the electromotive force $E_1$ of the secondary battery cell 11-1, and the electromotive force $E_2$ of the secondary battery cell 11-2, respectively, (Step 105).

When the cell balance controller 16 turns on the switch $SW_1$, a current flows in the secondary battery cell 11-1, the wire resistor $Rl_{01}$, the resistor $R_1$, and the wire resistor $Rl_{12}$ (Step 106).

The voltage measurer 12 stores the measured voltage v of the secondary battery module 11, the measured voltage $v_1$ of the secondary battery cell 11-1, and the measured voltage $v_2$ of the secondary battery cell 11-2 in the storage 5, and defines the voltages as the voltage V of the secondary battery module 11, the voltage (a first voltage) $V_1$ of the secondary battery cell 11-1, and the voltage (a second voltage) $V_2$ of the secondary battery cell 11-2 (Step 107).

The wire-resistance calculator 17 calculates the resistance value $rl_{01}$ of the wire resistor $Rl_{01}$ and the resistance value (a second resistance value) $rl_{12}$ of the wire resistor $Rl_{12}$ using the voltage V' of the secondary battery module 11, the voltage $V_1$' of the secondary battery cell 11-1, and the voltage $V_2$' of the secondary battery cell 11-2 which are measured by the voltage measurer 12 when the switch $SW_1$ is turned off in Step 105 and the voltage V of the secondary battery module 11, the voltage $V_1$ of the secondary battery cell 11-1, the voltage $V_2$ of the secondary battery cell 11-2, and the resistance value (a first resistance value) of the resistor $R_1$ which are measured by the voltage measurer 12 when the switch $SW_1$ is turned on in Step 107, and stores the calculated resistance values in the storage 5 (Step 108).

The cell balance controller 16 turns off the switch $SW_1$ (Step 109).

It is checked whether j=n is established (Step 119).

When j=n is not established, j=j+k is set in Step 120 and it is checked whether j>n is established in Step 121.

When it is determined that j>n is not established in Step 121, the process flow is returned to Step 104.

When it is determined that j>n is established in Step 121, j=n is set in Step 122 and the process flow is returned to Step 104.

Here, a method of calculating the resistance value $rl_{01}$ of the wire resistor $Rl_{01}$ and the resistance value $rl_{12}$ of the wire resistor $Rl_{12}$ in Step 108 will be described below.

The voltage V of the secondary battery module 11, the voltage $V_1$ (the first voltage) of the secondary battery cell 11-1, and the voltage $V_2$ of the secondary battery cell 11-2 which are measured by the voltage measurer 12 when the switch $SW_1$ is turned on in Step 107 are expressed by Equation (1), Equation (2), and Equation (3).

Equation (1)

$$V = V' - (Ri_1) \times I_1 \qquad (1)$$

Equation (2)

$$V_1 = V_1' - (Ri_1 + Rl_{01} + Rl_{12}) I_1 \qquad (2)$$

Equation (3)

$$V_2 = V_2' + Rl_{12} \times I_1 \qquad (3)$$

Here, when a current flowing in the resistor $R_1$ is defined as $I_1$, the current $I_1$ can be calculated by Equation (4) using the voltage $v_1$ of the secondary battery cell 11-1 and a known resistance value $r_1$ of the resistor $R_1$ Equation (4)

$$I_1 = \frac{V_1}{r_1} \quad (4)$$

Accordingly, by substituting Equation (1), Equation (3), and Equation (4) into Equation (2) and arranging the equation with respect to the wire resistor $Rl_{01}$, the resistance value $rl_{01}$ of the wire resistor $Rl_{01}$ can be calculated by Equation (5).

Equation (5)

$$rl_{01} = (V_1' - V_1 + V' - V + V_2' - V_2)\frac{r_1}{V_1} \quad (5)$$

By substituting Equation (4) into Equation (3), the resistance value $rl_{12}$ of the wire resistor $Rl_{12}$ can be calculated by Equation (6).

Equation (6)

$$rl_{12} = (V_2 - V_2')\frac{r_1}{V_1} \quad (6)$$

When j=1 is not established (Step 104) and j=n is established (Step 110), the wire-resistance calculator 17 stores the voltage v of the secondary battery module 11, a voltage $v_{n-1}$ of a secondary battery cell 11-$n$−1, and the voltage $v_n$ of the secondary battery cell 11-$n$ which are measured by the voltage measurer 12 in the storage 5, and defines the voltages as V', $V_{n-1}'$, and $V_n'$.

Here, since no current flows in the secondary battery module 11, the voltage V' of the secondary battery module 11, the voltage $V_{n-1}'$ of the secondary battery cell 11-$n$−1, and the voltage $V_n'$ of the secondary battery cell 11-$n$ are the same as the electromotive forces $E_1+E_2+\ldots+E_n$, $E_{n-1}$, and $E_n$ of the batteries (Step 111).

When the cell balance controller 16 turns on the switch $SW_n$, a current In (>0) flows in the secondary battery cell 11-$n$, the wire resistor $Rl_{n-1n}$, the resistor $R_n$, and the wire resistor $Rl_{nn+1}$ (Step 112).

The voltage measurer 12 measures the voltage v of the secondary battery module 11, the voltage $v_{n-1}$ of the secondary battery cell 11-$n$−1, and the voltage $v_n$ of the secondary battery cell 11-$n$, and defines the measured voltages as V, $V_{n-1}$, and $V_n$ (Step 113).

The wire-resistance calculator 17 calculates the resistance values $rl_{n-1n}$ and $rl_{nm-1}$ of the wire resistors $Rl_{n-1n}$ and $Rl_{nn+1}$ using the voltages V', $V_{n-1}'$, and $V_n'$ stored in the storage 5 by the wire-resistance calculator 17 in Step 111 and the voltages V, $V_{n-1}$, and $V_n$ measured by the voltage measurer 12 in Step 113, and stores the calculated resistance values in the storage 5 (Step 114).

The cell balance controller 16 turns off the switch $SW_n$ (Step 109).

It is checked whether j=n is established (Step 119).

Since j=n is established, the process flow moves to Step 123 and then ends.

The voltage v of the secondary battery module 11, the voltage $V_n$ of the secondary battery cell 11-$n$−1, and the voltage $V_{n-1}$ of the secondary battery cell 11-$n$ which are measured in Step 113 are expressed by Equation (7), Equation (8), and Equation (9).

Equation (7)

$$V=V'-(Ri_n)\times I_n \quad (7)$$

Equation (8)

$$V_{n-1}=V_2'+rl_{n-1n}I_n \quad (8)$$

Equation (9)

$$V_n=V_n'-(Ri_n+rl_{n-1n}+rl_{nn+1})I_n \quad (9)$$

When j=1 is not established (Step 104) and j=n is not established (Step 110), that is, when 1<j<n is established, the wire-resistance calculator 17 stores a voltage $v_{j-1}$ of a secondary battery cell 11-$j$−1, a voltage $v_j$ of a secondary battery cell 11-$j$, and a voltage $v_{j+1}$ of a secondary battery cell 11-$j$+1 measured by the voltage measurer 12, and defines these voltages as $V_{j-1}'$, $V_j'$, and $V_{j+1}'$.

Here, since no current flows in the secondary battery module 11, $V_{j-1}'$, $V_j'$, and $V_{j+1}'$ are the same as an electromotive force $E_{j-1}$ of the secondary battery cell 11-$j$−1, an electromotive force $E_j$ of the secondary battery cell 11-$j$, and an electromotive force $E_{j+1}$ of the secondary battery cell 11-$j$+1, respectively (Step 115).

The cell balance controller 16 turns on a switch SWj, and then a current Ij (>0) flows in the secondary battery cell 11-$j$, a wire resistor $Rl_{j-1j}$, a resistor $R_j$, and a wire resistor $Rl_{jj+1}$ (Step 116).

The voltage measurer 12 measures the voltage $v_{j-1}$ of the secondary battery cell 11-$j$−1, the voltage $v_j$ of the secondary battery cell 11-$j$, and the voltage $v_{j+1}$ of the secondary battery cell 11-$j$+1 (Step 117).

The wire-resistance calculator 17 calculates the resistance values of the wire resistor $Rl_{j-1j}$ and the wire resistor $Rl_{jj+1}$ using the voltage $V_{j-1}'$ of the secondary battery cell 11-$j$−1, the voltage $V_j'$ of the secondary battery cell 11-$j$, and the voltage $V_{j+1}'$ of the secondary battery cell 11-$j$+1 stored by the wire-resistance calculator 17 when all of the switches are turned off and the voltage $V_{j-1}$ of the secondary battery cell 11-$j$−1, the voltage $V_j$ of the secondary battery cell 11-$j$, and the voltage $V_{j+1}$ of the secondary battery cell 11-$j$+1 which are measured by the voltage measurer 12 when the switch SWj is turned on (Step 118).

The cell balance controller 16 turns off the switch SWj (Step 109).

It is checked whether j=n is established (Step 119).

When j=n is not established, j=j+k is set in Step 120 and it is checked whether j>n is established in Step 121.

When it is determined that j>n is not established in Step 121, the process flow is returned to Step 104.

When it is determined that j>n is established in Step 121, j=n is set in Step 122 and the process flow is returned to Step 104.

A method of calculating the resistance values of the wire resistor $Rl_{j-1j}$ and the wire resistor $Rl_{jj-1}$ in Step 118 will be described below.

The voltage Vj−1 of the secondary battery cell 11-$j$−1, the voltage Vj of the secondary battery cell 11-$j$, and the voltage $V_{j+1}$ of the secondary battery cell 11-$j$+1 which are measured by the voltage measurer 12 are expressed by Equation (10), Equation (11), and Equation (12).

Equation (10)

$$V_{j-1}=V_{j-1}'+r_{j-1j}I_j \quad (10)$$

Equation (11)

$$V_j = r_j I_j \quad (11)$$

Equation (12)

$$V_{j+1} = (V'_{j+1}) + r_{jj+1} I_j \quad (12)$$

When a resistance value $r_j$ of the resistor $R_j$ is known, Equation (11) and Equation (12) are substituted into Equation (10) and resistance values $r_{j-1j}$ and $r_{jj+1}$ of the wire resistors $Rl_{j-1j}$ and $Rl_{jj+1}$ are calculated by Equation (13) and Equation (14).

Equation (13)

$$r_{j-1j} = (V_{j-1} - V'_{j-1}) \frac{r_j}{V_j} \quad (13)$$

Equation (14)

$$r_{jj+1} = (V_{j+1} - V'_{j+1}) \frac{r_j}{V_j} \quad (14)$$

A method of calculating the voltages of the secondary battery cells 11-1, 11-2, . . . , and 11-$n$ using the resistance values of the wire resistors $Rl_{01}$, $Rl_{12}$, . . . , $Rl_{n-1n}$, and $Rl_{nn+1}$ which are measured in FIG. 2 will be described below.

Under the control of the cell balance controller 16, all of the switches $SW_1$, $SW_2$, . . . , and $SW_n$ are turned off.

At this time, the voltages of the secondary battery cells 11-1, 11-2, . . . , and 11-$n$ which are measured by the voltage measurer 12 are defined as $V_1'$, $V_2'$, . . . , and $V_n'$, respectively.

Under the control of the cell balance controller 16, operating conditions of the switches $SW_1$, $SW_2$, . . . , and $SW_n$ corresponding to the secondary battery cells 11-1, 11-2, . . . , and 11-$n$ are determined.

For example, when the voltage $V_1'$ (the fifth voltage) of the secondary battery cell 11-1 is higher than a predetermined threshold voltage or is higher than the voltages of other secondary battery cells such as the secondary battery cell 11-2, it is determined that the switch $SW_1$ corresponding to the secondary battery cell 11-1 should be turned on.

This determination is performed on the voltages $V_1'$, $V_2'$, . . . , and $V_n'$ of the secondary battery cells 11-1, 11-2, . . . , and 11-$n$.

That is, when it is determined that a secondary battery cell 11-$m$ (where m is any one of 1 to n) satisfies the operating condition, a switch $SW_m$ corresponding to the secondary battery cell 11-$m$ is turned on.

A cell voltage $V_m$ of the secondary battery cell 11-$m$, in which the switch $SW_m$ is turned on, is detected by the voltage measurer 12.

The wire-resistance calculator 17 calculates a current $I_m$ flowing in a resistor $R_m$ from the cell voltage $V_m$ when the switch $SW_m$ is turned on.

That is, the wire-resistance calculator 17 calculates the current value of the current $I_m$ in the secondary battery cell 11-$m$, in which the switch $SW_m$ is turned on, on the basis of the resistance value of the resistor $R_m$.

For example, when the switch $SW_1$ of the secondary battery cell 11-1 is turned on, the current value of the current $I_1$ is calculated on the basis of the resistance value $r_1$ of the resistor $R_1$.

The current value of the current $I_1$ is calculated by "$I_1 = V_1/r_1$."

The wire-resistance calculator 17 calculates a voltage drop value $\Delta V_m$ which is generated in a wire resistor $Rl_{m-1m}$ and a wire resistor $Rl_{mm+1}$ on the basis of the current value of the current $I_m$.

The voltage drop value $\Delta V_m$ is calculated by "$\Delta V_m = I_m \times (rl_{m-1m} + rl_{mm+1})$."

For example, when the switch $SW_1$ of the secondary battery cell 11-1 is turned on, the voltage drop value $\Delta V_1$ which is generated by the resistance value $rl_{01}$ of the wire resistor $Rl_{01}$ and the resistance value $rl_{12}$ of the wire resistor $Rl_{12}$ is calculated on the basis of the current value of the current $I_1$.

The voltage drop value $\Delta V_1$ is calculated by "$\Delta V_1 = I_1 \times (rl_{01} + rl_{12})$."

The wire-resistance calculator 17 corrects the voltage $V_m$ of the secondary battery cell 11-$m$ by adding the voltage drop value $\Delta V_m$ to the voltage $V_m$ of the secondary battery cell 11-$m$.

A true voltage of the secondary battery cell 11-$m$ can be calculated by "$V_m + \Delta V_m$."

For example, when the switch $SW_1$ of the secondary battery cell 11-1 is turned on, a true voltage (a fourth voltage) of the secondary battery cell 11-1 is calculated by adding the voltage drop value $\Delta V_1$ to the voltage $V_1$ of the secondary battery cell 11-1 detected by the voltage measurer 12 ($V_1 + \Delta V_1$).

j=1 is set in Step 103 and it is checked whether j=n is established in Step 119, but this checking may not necessarily be performed.

For example, when the resistance value of the wire resistor $Rl_{23}$ is set as j=2 in Step 103. it is checked whether j=2 is established in Step 119.

Similarly, Step 103, Step 119, or the predetermined k may be changed depending on the resistance value of the wire resistor $Rl_{jj+1}$ which will be calculated.

Since resistors of wires between a certain secondary battery cell 11-$x$ and junction points $T_{x-1x}$ and $T_{xx+1}$ can be considered as an internal resistor $Ri_x$ of the secondary battery cell 11-$x$, the resistor of the wire between the secondary battery cell 11-$x$ and the junction point $T_{x-1x}$ and the resistor of the wire between the secondary battery cell 11-$x$ and the junction point $T_{xx+1}$ do not have to be considered.

Since a small current flows in the wires between the junction points $S_{01}$, $S_{12}$, . . . , and $S_{nn+1}$ and the voltage measurer 12 for the purpose of accurate voltage measurement, the wire resistors may be ignored.

Step 105, Step 111, and Step 115 may be performed after Step 109.

Figure 3:
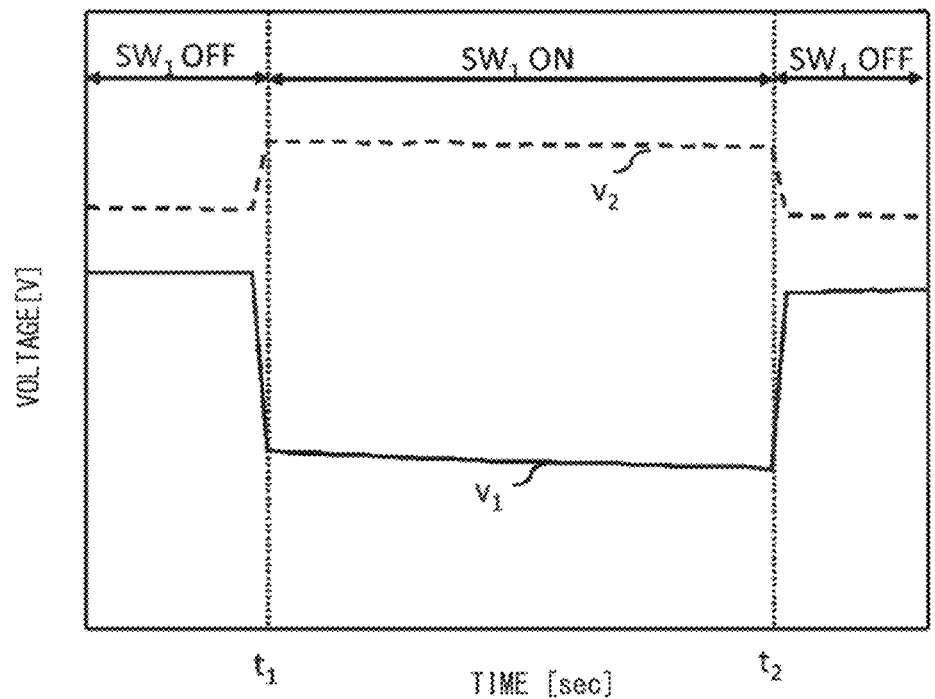
FIG. 3 is a diagram showing a relationship between time and voltage of a secondary battery cell.

FIG. 3 is a diagram showing the voltage $v_1$ of the secondary battery cell 11-1 and the voltage $v_2$ of the secondary battery cell 11-2 which are measured by the voltage measurer 12 when the switch $SW_1$ is turned on or off in the process flow shown in FIG. 2.

The horizontal axis represents time (seconds) and the vertical axis represents voltage (V).

A solid line indicates the voltage $v_1$ of the secondary battery cell 11-1 and a broken line indicates the voltage $v_2$ of the secondary battery cell 11-2.

Between a time $t_1$ and a time $t_2$, the switch $SW_1$ is turned on.

When the switch $SW_1$ is turned on, a current flows in the secondary battery cell 11-1.

The voltage $v_1$ measured by the voltage measurer 12 at this time is not the electromotive force of the secondary battery cell 11-1.

As expressed by Equation (2), the voltage of the secondary battery cell 11-1, that is, the voltage between the junction point $T_{01}$ and the junction point $T_{12}$, which should be measured cannot be measured due to an influence of a voltage drop in the wire resistors $Rl_{01}$ and $Rl_{12}$, in addition to a voltage drop in the internal resistor $Ri_1$ of the secondary battery cell 11-1.

Between the time $t_1$ and the time $t_2$, the voltage $v_1$ greatly decreases.

When the switch $SW_1$ is turned on, no current flows in the secondary battery cell 11-2.

Since the voltage $v_2$ of the secondary battery cell 11-2 which is measured by the voltage measurer 12 is a voltage between the junction point $S_{12}$ and the junction point $S_{23}$, a voltage rise due to the wire resistor $Rl_{12}$ is added thereto as expressed by Equation (3), and the voltage increases to be more than it is before the time $t_1$ and after the time $t_2$.

Accordingly, the voltage measurer 12 does not accurately measure the voltage $v_1$ of the secondary battery cell 11-1 and the voltage $v_2$ of the secondary battery cell 11-2.

Figure 4:
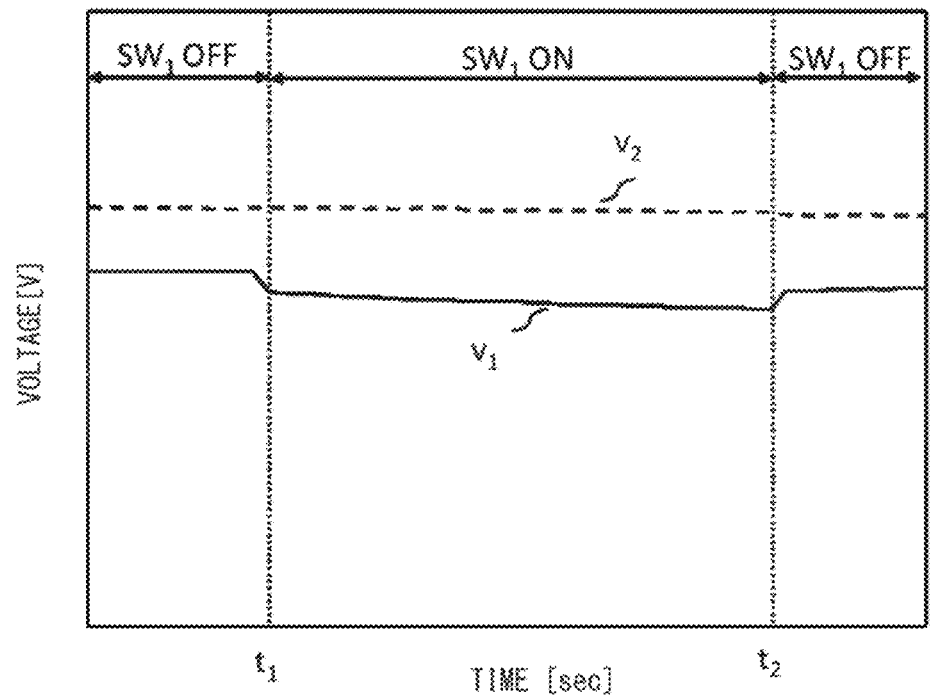
FIG. 4 is a diagram showing a relationship between time and voltage of a secondary battery cell.

FIG. 4 shows the voltage $v_1$ of the secondary battery cell 11-1 and the voltage $v_2$ of the secondary battery cell 11-2 which are corrected using the resistance values of the wire resistors $Rl_{01}$, $Rl_{12}$, $Rl_{n-1n}$, and $Rl_{nn+1}$ calculated by the wire-resistance calculator 17.

The horizontal axis represents time (seconds) and the vertical axis represents voltage (V).

A solid line indicates the voltage $v_1$ of the secondary battery cell 11-1 and a broken line indicates the voltage $v_2$ of the secondary battery cell 11-2.

Between a time $t_1$ and a time $t_2$, the switch $SW_1$ is turned on.

Immediately after the switch $SW_1$ is turned on, the voltage $v_1$ of the secondary battery cell 11-1 drops due to the internal resistor $Ri_1$ of the battery.

This is because a voltage drop due to the wire resistor $Rl_{01}$ and the wire resistor $Rl_{12}$ is added to the voltage $v_1$ of the secondary battery cell 11-1 shown in FIG. 3.

Immediately after the switch $SW_1$ is turned on, the voltage $v_2$ of the secondary battery cell 11-2 does not vary.

This is because a voltage rise due to the wire resistor $Rl_{12}$ is subtracted from the voltage $v_2$ of the secondary battery cell 11-2 in FIG. 3.

It is possible to accurately calculate the voltage $v_1$ of the secondary battery cell 11-1 and the voltage $v_2$ of the secondary battery cell 11-2 by correcting the voltage $v_1$ of the secondary battery cell 11-1 and the voltage $v_2$ of the secondary battery cell 11-2 which are measured by the voltage measurer 12 using the resistance values of the wire resistors $Rl_{01}$, $Rl_{12}$, ..., $Rl_{n-1n}$, and $Rl_{nn+1}$.

Figure 6:
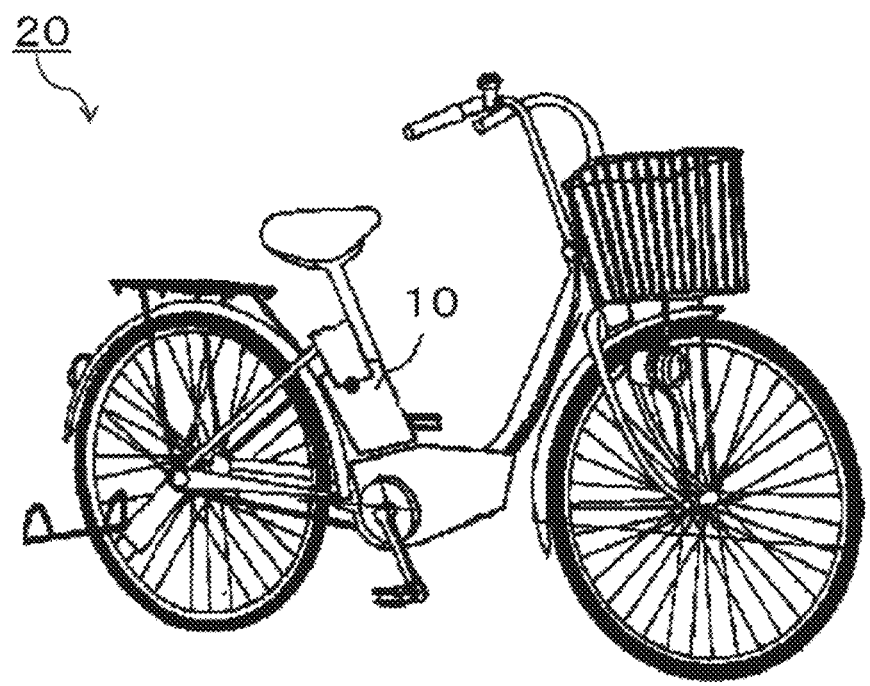
FIG. 6 is a diagram showing an electric bicycle including the battery.

The battery 10 is used for an electric bicycle 20 shown in FIG. 6.

Second Embodiment

Figure 5:
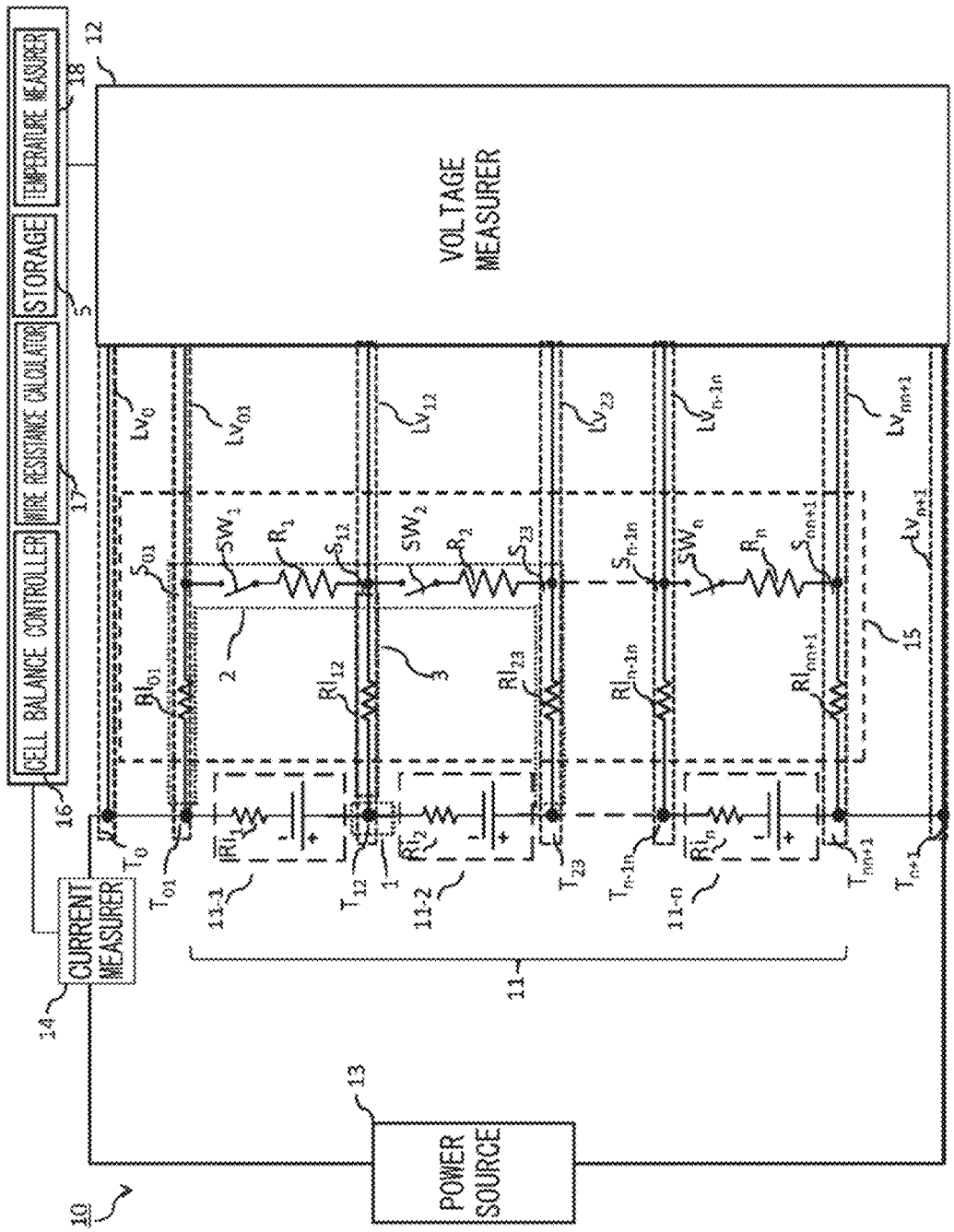
FIG. 5 is a diagram showing a battery including a temperature measurer.

FIG. 5 shows a configuration of the battery 10 including a temperature measurer 18.

The battery 10 shown in FIG. 5 further includes the temperature measurer 18 in addition to the components of the battery 10 shown in FIG. 1.

The same elements shown in FIG. 1 will be provided with the same reference signs, and a description thereof will not be repeated.

The temperature measurer 18 measures temperatures around the secondary battery module 11 or the resistors $R_1$, $R_2$, ..., and $R_n$.

Since the resistance value $r_j$ of the resistor $R_j$ depends on the temperature, the resistance value $r_j$ varies depending on the temperature.

A table in which the temperature measured by the temperature measurer 18 and the resistance value $r_j$ of the resistor $R_j$ are correlated with each other is stored in the storage 5 in advance.

A relationship between the temperature and the resistance value $r_j$ of the resistor $R_j$ is considered by setting temperature as the horizontal axis and setting the resistance value $r_j$ of the resistor $R_j$ as the vertical axis.

When the temperature is defined as T, the relationship between the temperature T and the resistance value $r_j$ of the resistor $R_j$ is expressed by Equation (15).

Equation (15)

$$r_j = aT + b \tag{15}$$

Here, a denotes a slope and b denotes an intercept.

For example, a=0.04 and b=30 ($\Omega$) are set.

For example, the wire-resistance calculator (a controller) 17 acquires the resistance value (a third resistance value) of the resistor $R_1$ (the first resistor) corresponding to the temperature measured by the temperature measurer 18 from the table stored in the storage 5.

The wire-resistance calculator (the controller) 17 calculates the resistance value (a fourth resistance value) of the wire (the third wire) 3 using the voltage $V_1$ (the first voltage) of the secondary battery cell 11-1 (the first battery), the voltage $V_2$ (the second voltage) of the secondary battery cell 11-2 (the second battery), the voltage $V'_2$ (the third voltage) of the secondary battery cell 11-2 (the second battery), and the resistance value (the third resistance value) of the resistor $R_1$ (the first resistor).

The battery 10 including the temperature measurer 18 is used for the electric bicycle 20 shown in FIG. 6.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   a first battery that comprises a first positive electrode and a first negative electrode;
   a second battery that comprises a second positive electrode and a second negative electrode;
   a first wire that connects the first positive electrode and the second negative electrode;
   a second wire that connects the first negative electrode and the second positive electrode;
   a third wire that connects the first wire and the second wire;
   a first resistor that is inserted into the second wire between a junction point of the second wire and the third wire and the first negative electrode;
   a first switch that is inserted into the second wire between the first resistor and the first negative electrode;
   a second switch that is inserted into the second wire between the junction point and the second positive electrode;

a second resistor that is inserted into the second wire between the second switch and the second positive electrode;

a voltage measurer that measures a voltage between the first switch and the first negative electrode in the second wire, a voltage between the second resistor and the second positive electrode in the second wire, and a voltage of the junction point; and a controller, wherein the controller calculates a second resistance value of the third wire using a first voltage of the first battery when the first switch is turned on and the second switch is turned off, a second voltage of the second battery when the first switch is turned on and the second switch is turned off, a third voltage of the second battery when the first switch is turned off and the second switch is turned off, and a first resistance value of the first resistor.

2. The battery according to claim 1, wherein the controller calculates a fourth voltage of the first battery using the second resistance value of the third wire, the first voltage of the first battery, and the first resistance value of the first resistor.

3. The battery according to claim 1, wherein when the first switch is turned off and the second switch is turned off, the controller turns on the first switch when a fifth voltage of the first battery is higher than the third voltage of the second battery, and turns on the second switch when the third voltage of the second battery is higher than the fifth voltage of the first battery.

4. The battery according to claim 1, further comprising:

a temperature measurer that measures a temperature around the first resistor; and a storage that stores a table in which the temperature and a third resistance value of the first resistor are correlated with each other, wherein the controller calculates the third resistance value corresponding to the temperature measured by the temperature measurer from the table stored in the storage, and calculates a fourth resistance value of the third wire using the first voltage of the first battery, the second voltage of the second battery, the third voltage of the second battery, and the third resistance value of the first resistor.

5. An electric bicycle comprising the battery according to claim 1.

* * * * *